2,812,370

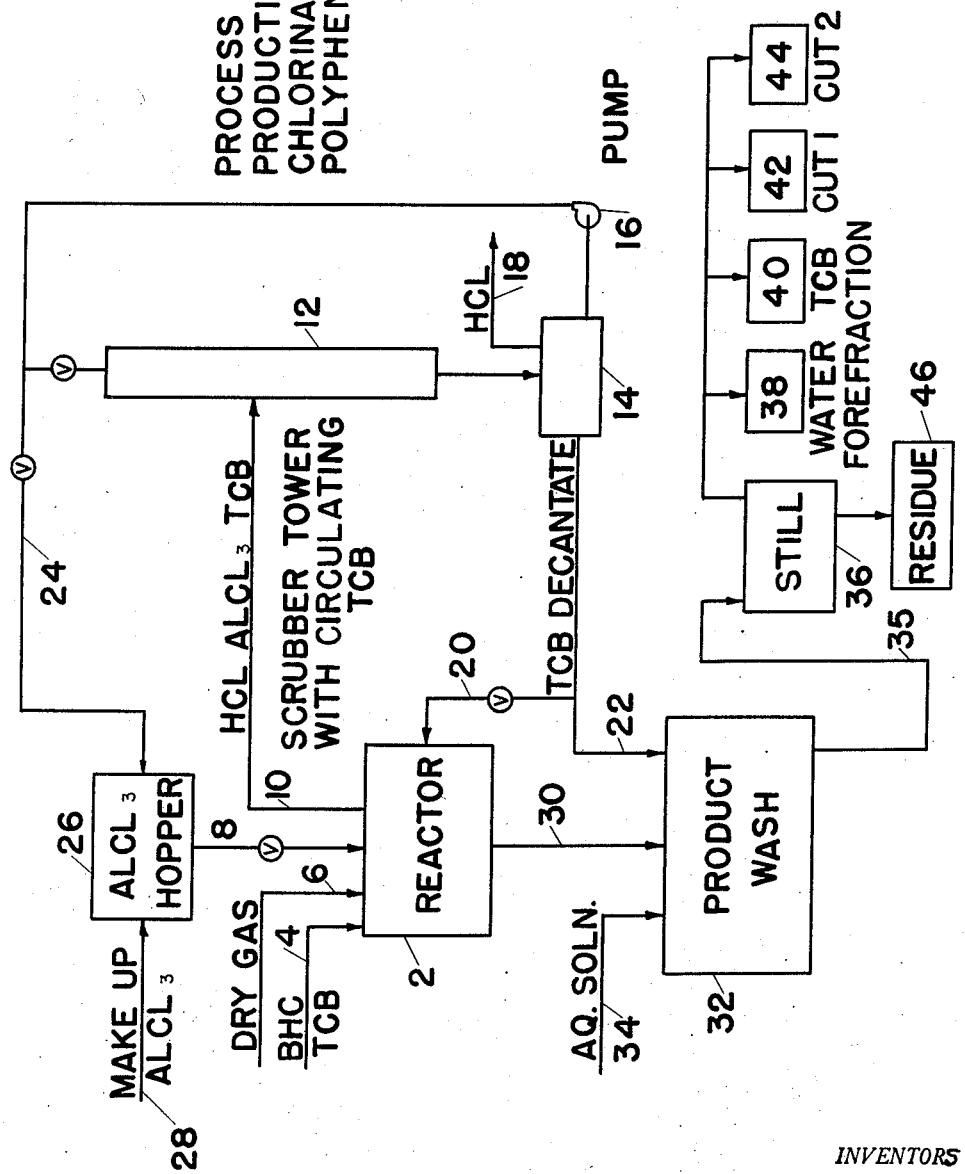

RECOVERY OF ALUMINUM CHLORIDE CATALYST

Thomas Robert Bell, Strafford, and Paul Gordon Haines, Lafayette Hill, Pa., assignors to Pennsalt Chemicals Corporation, a corporation of Pennsylvania Application April 29, 1954, Serial No. 426,492

7 Claims. (Cl. 260—649)

This invention relates to a method for the production of chlorinated polyphenyls from hexachlorocyclohexane, or benzene hexachloride, a major advantage of the process being that a large portion of the anhydrous aluminum chloride catalyst is recovered in anhydrous and readily reusable form.

In the manufacture of the gamma isomer of benzene hexachloride, which is useful as an insecticide, a large quantity of other isomers of benzene hexachloride is obtained as a by-product, and various procedures have been utilized in an attempt to convert the alpha and beta isomers into useful chemical compositions since they possess no insecticidal activity.

In U. S. Patent 2,569,441 there is disclosed a process in which benzene hexachloride may be converted catalytically to trichlorobenzene, the process comprising the treatment of benzene hexachloride with 0.5 to 5 percent of its weight of anhydrous aluminum chloride, at a temperature between 125 and 225° C.

In co-pending application Serial No. 422,992 filed it is disclosed that chlorinated polyphenyls may be produced from benzene hexachloride by reaction of the benzene hexachloride with a reactive aromatic compound in the presence of an aluminum chloride catalyst. Among the reactive aromatic compounds which may be employed are the incompletely halogenated benzene derivatives, e. g., mono-, di-, tri- and tetrachloro- and bromo-benzenes, and trichlorofluorobenzene, diphenyl, naphthalene, and the isomeric xylenes. The preferred reactive aromatic compounds are di- and trichlorobenzenes. Exemplary of non-reactive substituted aromatic compounds is nitrobenzene, the use of which fails to produce any chlorinated polyphenyls in the method of the invention.

The process of the present invention constitutes an improvement over the process disclosed in the above-identified co-pending application in that, in the process of the present invention, the effluent reactor gases, and the materials entrained therein, are passed into a scrubbing tower containing a circulating organic compound, which is preferably aromatic in nature. The effluent reactor gases consist primarily of hydrogen chloride containing entrained particles of aluminum chloride catalyst and reactive aromatic compound. These materials are carried down the scrubber tower by the scrubber liquid to a decanter from which hydrogen chloride gas is released and passed into a conventional absorbing tower. The scrubber liquid, and reactive aromatic compound admixed therewith, is decanted for reuse in the process and a slurry of aluminum chloride catalyst in the scrubber liquid is also separated from the decanter for recycle to the catalyst feed hopper.

The reactive aromatic compound is preferably identical with the compound employed for the scrubber liquid. Hence, when trichlorobenzene is employed as the reactive aromatic compound and also as the scrubber liquid, the trichlorobenzene may be passed from the decanter directly into the reactor for further use in the process and the slurry of aluminum chloride and trichlorobenzene may be recycled to the reaction zone, without separation of the catalyst from the scrubber liquid.

The concentration of anhydrous aluminum chloride catalyst may be 2 to 30 percent by weight of the original benzene hexachloride charged and is preferably 10 to 25 percent of the benzene hexachloride initially present. The reaction temperature may be within the range of 100 to 225° C., with the reflux temperature of the reaction mixture being within the range of 220 to 225° C. The reaction time may be in the range of 2 to 30 hours.

The reaction mixture may contain 0.25 to 2 parts by weight of reactive aromatic compound for each part by weight of benzene hexachloride. Larger quantities of aromatic compound require more aluminum chloride catalyst to obtain complete reaction of the benzene hexachloride, whereas the use of smaller quantities results in a lower yield of chlorinated polyphenyls.

Referring to the accompanying drawing, a flow diagram of the process of the invention is shown in which the reactor 2 is equipped with a charging line 4 for benzene hexachloride and reactive aromatic compound, which in the embodiment shown is trichlorobenzene, a line 6 for admitting dry gas and a line 8 for charging aluminum chloride. The benzene hexachloride and trichlorobenzene are reacted in the reactor 2 in the presence of the aluminum chloride catalyst while heating the reaction mixture at reflux temperature so that the major portion of the hydrogen chloride gas evolved from the reaction mixture is evolved in approximately 2 hours. The line 10 connecting the reactor 2 and the scrubber 12 is heated in order to prevent blocking thereof by sublimation. Hydrogen chloride gas begins to be evolved from the reaction mixture at a temperature of about 100° C. and continues to be evolved until the reaction is complete. Heating of the reaction mixture at reflux temperature is continued until hydrogen chloride evolution ceases and then a dry, inert gas, such as air or nitrogen, is passed into the reactor 2 through the line 6 for a period of approximately 1 hour. This dry air entrains the major portion of the aluminum chloride catalyst and carries it through the line 10 into the scrubber 12. It is then carried into the decanter 14 by the circulating trichlorobenzene in the scrubbing tower, this material being circulated by the pump 16. The hydrogen chloride gas released from the decanter 14 passes to any conventional absorbing tower, not shown, by way of the line 18.

The scrubber liquid in the decanter 14 settles into two layers, the lighter of which is primarily trichlorobenzene and the heavier of which is a slurry of anhydrous aluminum chloride catalyst in trichlorobenzene. The trichlorobenzene layer may be decanted and passed into the reactor 2 through the line 20 for further reaction with benzene hexachloride or may be passed into the product wash tank through the line 22. The slurry of aluminum chloride catalyst in trichlorobenzene is passed by the pump 16 through the line 24 into the aluminum chloride feed hopper 26, which has a line 28 connected thereto for the addition of make-up aluminum chloride catalyst.

The reaction mixture is passed through the line 30 into the product wash tank 32, having a line 34 connected thereto for the addition of sodium hydroxide solution. The reaction mixture is washed in the product wash tank with sufficient sodium hydroxide, at a temperature of about 100° C., to remove the aluminum salts. This treatment is followed by a filtration, in any conventional equipment, not shown, to remove solids that hinder separation of the two washed layers. As an alternative washing procedure, in which the formation of solids is minimized, the reaction mixture is first washed with hot dilute hydrochloric acid to remove the aluminum salts and then with dilute sodium hydroxide solution to remove the acid. If the reaction mixture is too viscous to wash, it is diluted with trichlorobenzene.

The washed product, without drying, is then passed through the line 35 into the still 36, where it is distilled first at a pressure of 20 to 30 mm. of mercury absolute to remove the water and trichlorobenzene fractions, indicated at 38 and 40 respectively. Unslaked lime (calcium oxide) is then added to the still pot and distillation is continued to obtain a product, Cut 1, 42, and a product, Cut 2, 44. The still pot residue 46 is a brittle black solid.

The recovery of aluminum chloride catalyst from the scrubber liquids in accordance with the process of the invention may be between 72 and 92 percent by weight of the aluminum chloride catalyst originally charged, and averages about 83 percent.

The invention will be further illustrated by reference to the following specific example:

EXAMPLE 1

2000 grams of the mixed alpha and beta isomers of benzene hexachloride, 1200 grams of trichlorobenzene, and 500 grams of anhydrous aluminum chloride were charged into a 5-liter, 3-necked flask equipped with a thermowell and a Glascol heater. The reaction mixture was gradually heated; evolution of hydrogen chloride gas therefrom began when a temperature of 100° C. was reached and continued while the reaction mixture was heated to reflux temperature. The reaction mixture was refluxed for a period of about 2 hours and the hydrogen chloride gas evolved from the reaction mixture, together with the entrained material therein, was passed through a wide diameter glass tube to a glass scrubbing tower containing anhydrous trichlorobenzene circulated by a Monel metal pump through a Monel metal circulating line. The hydrogen chloride gas then passed into a decanter and through a simple trap to remove any liquid spray, after which it was passed into an absorbing tower containing circulating sodium hydroxide, the tower being mounted on a balance for continuous weighing.

At the end of the two-hour heating period, the evolution of hydrogen chloride gas substantially ceased, and a rapid flow of dry air was passed through the mixture for a period of about one hour while the reaction mixture was maintained at a temperature near its boiling point. The flow of dry air served to separate the majority of the aluminum chloride catalyst from the reaction mixture, and the catalyst was carried by entrainment into the trichlorobenzene circulating in the scrubber.

The reaction mixture was then cooled, washed with sodium hydroxide solution at a temperature of 100° C., to remove aluminum salts, and filtered. The washed product, without drying, was then distilled at a pressure of 20 to 30 mm. of mercury absolute to remove the water and trichlorobenzene therefrom. Unslaked lime (calcium oxide) was then added to the still pot in an amount equal to 3 percent of the weight of the still pot contents, and distillation was continued to obtain a product, Cut 1, as a nearly colorless viscous liquid boiling at a temperature of 150 to 215° C. at a pressure of 0.2 mm. Hg absolute, and a product, Cut 2, which was an amber colored resin boiling at a temperature of 215 to 280° C. at a pressure of 0.3 mm. Hg absolute. The remainder of the material was a brittle black still pot residue.

Two successive runs were made in each of which 2000 grams of mixed alpha and beta isomers of benzene hexachloride were charged to the reactor, together with trichlorobenzene from the decanter and a small portion of make-up trichlorobenzene. Aluminum chloride catalyst slurry from the decanter was employed together with a small quantity of make-up catalyst.

In run No. 2, 1585 grams of aluminum chloride slurry were charged to the reactor, which consisted of approximately 444 grams of anhydrous aluminum chloride and 1141 grams of trichlorobenzene. To this mixture were added 52 grams of make-up trichlorobenzene and 60 grams of make-up anhydrous aluminum chloride catalyst.

In run No. 3, 1754 grams of aluminum chloride slurry and trichlorobenzene were charged to the reactor, of which approximately 458 grams were aluminum chloride and 1296 grams were trichlorobenzene. To this mixture were added 50 grams of make-up trichlorobenzene and 60 grams of make-up anhydrous aluminum chloride catalyst.

The results of these runs are as follows:

Table 1

| Run No. | Reactants | | | Conditions | | Products | | | | Remarks |
|---|---|---|---|---|---|---|---|---|---|---|
| | α,β-BHC charged, g. | AlCl₃ charged | TCB charged | Temp., °C. | Time, hrs. | HCl, g. | Cut 1 | Cut 2 | Residue | |
| 1 | 2,000 | 500 g. | 1,200 g. | 100–230 | 3 | 945 | Products of three runs combined | | | 55.7 g. AlCl₃ found in product. |
| 2 | 2,000 | 1,585 g. slurry: AlCl₃=444 g.; TCB=1,141 g. | 418 g. from scrubber +52 g. make-up. | 100–230 | 3 | 930 | Products of three runs combined | | | 42.1 g. AlCl₃ found in product. |
| 3 | 2,000 | 1,754 g. slurry: AlCl₃=458 g.; TCB=1,296 g. | 404 g. from scrubber +50 g. make-up. | 100–230 | 3 | 942 | 812.7 g.; 53.3% Cl. | 461.4 g.; 52.1% Cl. | 1,620.8 g.; 44.1% Cl. | 98.4 g. AlCl₃ found in product. 356 g. AlCl₃ found in scrubber. |

The chlorinated polyphenyls produced by the process of the invention find wide industrial application, e. g., as dielectrics, hydraulic mediums, lubricants, impregnating materials, plasticizers and additives for use in paints, varnishes and waxes.

It will be obvious to those skilled in the art that many modifications may be made within the scope of the present invention without departing from the spirit thereof, and the invention includes all such modifications.

We claim:

1. In the aluminum chloride catalyzed process for the production of chlorinated polyphenyls by reaction of benzene hexachloride with a reactive aromatic compound, the improvement for recovering the aluminum chloride catalyst comprising maintaining the reaction product mixture near its boiling point while entraining the said catalyst in an inert gas leaving the reactor, directing the gas with contained catalyst into a scrubbing tower, scrubbing the said gas with an aromatic liquid, discharging the said liquid containing the catalyst from the scrubbing tower and returning the catalyst to the reactor for reuse.

2. The process according to claim 1 in which the catalyst is separated from the major portion of the scrubbing liquid before the catalyst is returned to the reactor.

3. The process according to claim 2 in which the reactive aromatic compound and the scrubber liquid are the same compound.

4. The process according to claim 1 in which the catalyst is separated from the scrubbing liquid before the catalyst is returned to the reactor.

5. A process according to claim 1 in which the reactive aromatic compound has the formula

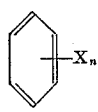

in which X is selected from the group consisting of fluorine, chlorine and bromine and $n$ is an integer from 1 to 4.

6. A process according to claim 1 in which the reactive aromatic compound is selected from the group consisting of diphenyl, naphthalene, and the isomeric xylenes.

7. A process according to claim 1 in which the reactive aromatic compound has the formula

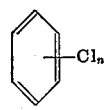

in which $n$ is an integer from 1 to 4.

References Cited in the file of this patent

UNITED STATES PATENTS

| | | |
|---|---|---|
| 2,055,929 | Jackson et al. | Sept. 29, 1936 |
| 2,569,441 | Alquist et al. | Oct. 2, 1951 |